DATA INPUT DEVICE

Filed Dec. 30, 1959

INVENTOR
MARTIN J. KELLY
BY William N. Barret
ATTORNEY

United States Patent Office 3,201,759

Patented Aug. 17, 1965

3,201,759
DATA INPUT DEVICE

Martin J. Kelly, Endwell, N.Y., assignor to International Business Machines Corporation, New York, N.Y., a corporation of New York Filed Dec. 30, 1959, Ser. No. 863,025
2 Claims. (Cl. 340—172.5)

The present invention relates to an input apparatus for a data processing system and in particular to an apparatus for reading record cards and storing the data contained therein in a data storage device forming part of a data processing system.

In reading record cards which may contain 80 columns of data coded by punching holes in 12 preselected rows, it is common practice to read the card by row and transmit each row indication by column to a data storage device.

As shown in the art, there are devices which read each row of data from the card and store the same in a passive or static network of cores. In performing this function, each row of cores is successively conditioned for each successive row of data contained in the card so that the presence of a hole in a particular row and column intersection will be recorded by setting a magnetic core. When the entire card has been read, the core array which will have as many cores as possible hole locations in the card, will have a format which is identical to the card. The disadvantage here is in the fact that it is necessary to have a special core storage with addressing means for the output of information from a card.

Where the storage of information in the main core storage of a machine is in two-out-of-five bit position code, 0, 1, 2, 3, 6 and the number is represented by a combination of two bits, it is economically unfeasible to utilize one character position (five bit positions for example) to indicate the presence of a single bit in the card being read.

It is therefore an object of this invention to provide an improved data input device.

A further object of the present invention is to provide an apparatus for entering information into a storage device in which said information requires fewer character positions in said device.

Another object of this invention is to provide an apparatus for entering columns of data from a card into a storage device in two-out-of-five code wherein each column of data is stored in three character positions.

The foregoing and other objects, features and advantages of the invention will be apparent from the following more particular description of a preferred embodiment of the invention, as illustrated in the accompanying drawings.

Figures 1, 2:
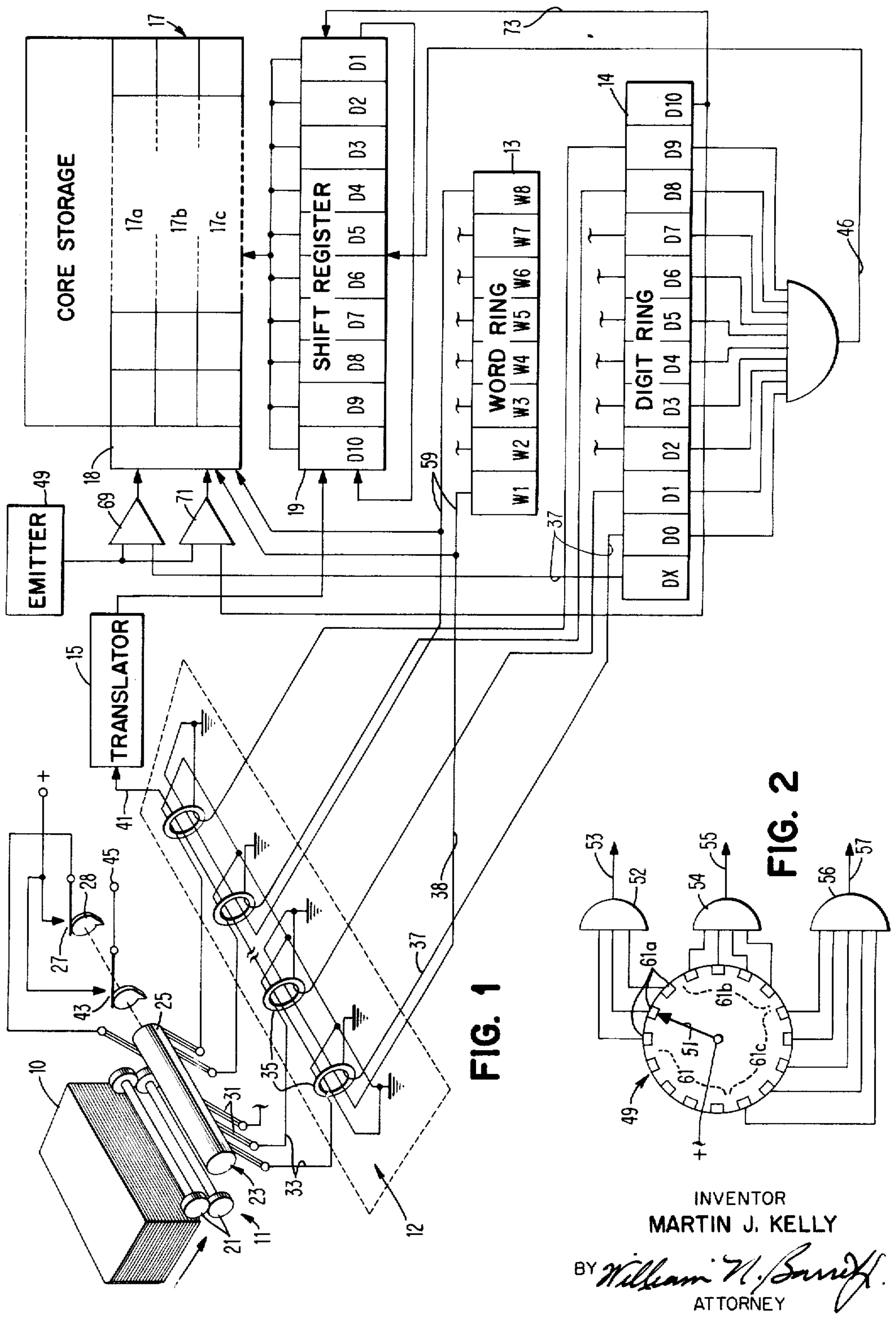
FIG. 1 is a schematic illustration of the invention.
FIG. 2 shows the emitter of FIG. 1.

With a record card 10 as shown in FIG. 1, there are 80 columns of data and 12 rows in which a permutation of punched holes determines the significance of the data. A few selected examples of the card code and the machine code to which the character will eventually be translated are as follows:

| Character | Card Code | Two-out-of-Five Code Indicated Decimally |
|---|---|---|
| 1 | 1 | 91 |
| 2 | 2 | 92 |
| 3 | 3 | 93 |
| 9 | 9 | 99 |
| A | 12-1 | 61 |
| B | 12-2 | 62 |
| I | 12-9 | 69 |
| J | 11-1 | 71 |
| K | 11-2 | 72 |
| R | 11-9 | 79 |
| S | 0-2 | 82 |
| T | 0-3 | 83 |
| 2 | 0-9 | 89 |
| . | 12-3-8 | 18 |
| & | 12 | 20 |
| $ | 11-3-8 | 28 |
| # | 3-8 | 48 |

The two digit, two-out-of-five code shown above is the result of a translation of the results stored in the different zones of storage by the present invention.

When reading a card by row, one of the problems which presents itself is the recognition of a character stored in a row. From the code shown, it can be seen that if the 8 row is sensed and there is a hole punched therein for a given column, the character may be an 8, or if there is a hole punched in row 3, the character will be #. With each character having a particular storage code, it is necessary that the type of character be recognized prior to reading the rows or the rows be treated on an individual basis, accumulated and then translated to a machine code.

Numerous methods of providing a translation to the proper machine code for a given character have been used. The present invention which is concerned with entry of the data into a core storage, divides the data from the card into three groups.

These groups are:

(1) Rows 12, 11, 0
(2) Rows 1–4
(3) Rows 5–9

Reference to the selected code representation of the above chart will show that there is only a single possible punched hole position in each group.

In the storage 17, each row of characters, shown by the divisions 17*a*, 17*b* and 17*c*, accepts data from the corresponding zones of the card. Since each zone in storage must accept a plurality of row indications, the data from any preceding row is shifted in parallel to the shift register 19 prior to the transfer of any row of information from the row buffer 12 of any row in the same zone. The data which the shift register moves into and out of storage is cumulative for the rows in each zone. When the entire card has been read, the storage will contain the information therefrom coded into three characters per column which may be read out and translated into the storage code shown above.

Before proceeding with a general description of the invention, certain background information is desirable. The storage device 17 shown in FIG. 1 is contained in a data processing machine which uses the same to provide instructions and data for operation of the machine. Data is read into the storage and out from the storage by a selection of coordinates. The data is in the form of a character or series of characters comprising a permutation of bits. In this instance the coordinate selection in said storage is by word consisting of ten characters. The selection means for the storage is shown at 18.

A batch of record cards 10, FIG. 1, to be read, are stacked in a hopper, not shown, so that they rest on an oscillating picker knife, not shown, which feeds cards from the bottom of the stack to power driver feed rolls 21 which move each card to a sensing station 23. In the sensing station, a conductive roll 25 has applied thereto a potential through a circuit breaker 27 which opens and closes for each possible data position or row. The circuit breaker 27 is closed for the proper duration by a cam 28 operated by contact roll 25. A record card to be sensed passes between the conducting roll and sensing brushes 31 aligned with each card column. Each time a sensing brush makes contact through a hole in the record column, an accurately defined pulse is applied to a particular output line 33.

As each row of information is sensed by the brushes, any punched hole will allow a circuit to be completed and set a magnetic core 35 to a particular stable state indicative of the fact that a hole was then sensed. After the termination of the row pulse, the buffer cores 35 are reset. These cores 35 are reset by pulses applied to windings 37 and 38 threaded through each one which are furnished by a word ring 13 and a digit ring 14. As the cores are reset, any core which has been set prior thereto will have its magnetization reversed and generate a pulse on line 41.

A circuit breaker 43 closes after termination of the row pulse from circuit breaker 27 to generate a pulse on line 45 to initiate the operation of a word and digit ring 13 and 14. The apparatus for producing advancing pulses for the word and digit rings has not been shown since the particular apparatus forms no part of the present invention. It is, of course, possible to have the word and digit ring running continuously and couple the same to the buffer upon occurrence of the transfer pulse from circuit breaker 43.

The word ring 13 and digit ring 14 are advanced so that each successive stage is turned ON. The digit ring 14 completes one cycle as each stage of the word ring is turned ON. With these rings, a total of 80 separate selections have been made in the buffer 12.

The shift register 19 will accept ten digits from core buffer 12 and transfer the same to a position in storage 17 in accordance with the word being read from buffer 12. The interrelationship of digits contained in core buffer 12 and storage 17 is determined by word ring 13 which by means of its outputs 59 selects each group of cores in buffer 12 in coincidence with the outputs 37 of the digit ring 14 and furnish an input to selection circuit 18 to select the applicable word.

The selection of a particular word in storage 17 is accomplished in cooperation with the output of an emitter 49 shown particularly in FIG. 2. Movable contact 51 moved in synchronism with a card 10 through the sensing station 23. For each row of the card 10, a stationary contact 61, **61*a*, 61*b* or 61*c* is provided. This contact is connected to a potential by the movable contact 51. The contacts 61*a* are in contact with movable contact at row times 12, 11, and 0 to generate a pulse on output 53 through OR circuit 52. Contacts 61*b* are in contact with movable contact at row times 1, 2, 3 and 4 while contacts 61*c* supply an output 57** at row times 5, 6, 7, 8 and 9.

In review, it is seen that the digit and word rings 14 and 13 are used to read out the 80 cores in buffer storage by utilization of 8 word outputs and 10 digit outputs. The storage 17 which is adapted to receive the data from the cores has three character zones, **17*a*, 17*b*, and 17*c***, each divided into 8 words. With the object to store the data from:

rows 12, 11, 0 in zone 1, **17*a***
rows 1, 2, 3, 4 in zone 2, **17*b***
rows 5, 6, 7, 8, 9 zone 3, **17*c*** the emitter 49 is used to select one coordinate of storage 17 for the common planes of cores in which rows of data will be stored. The other coordinate for the data from each row is obtained from the output of each individual stage in the word ring which is related to the particular word of row information being read from core storage 12.

In each zone, **17*a*, 17*b*, or 17*c***, there is one character position for each zone in each column of the card. The information in each character position must therefore be available to accept one of a plurality of possible indications which may occur in the rows of the card applicable to that position.

For each zone of the card and for each word in the zone, the shift register 19 operates to collect data from the storage 17 in parallel and to accept any data serially from the buffer 12 for a row in the same zone. When 10 digits of a word from buffer 12 have been accepted, the register restores the data to the storage 17 in accordance with the word which has been read and the zone as determined by the output of emitter 49 and word ring 13.

The output on line 41 is translated from a pulse occurring at a predetermined row time and will be translated by translator 15 into a coded representation. A translator as shown in the patent to Smith, Patent No. 2,798,554, which converts a single bit pulse in time to a biquinary coded representation would be used although the code could be two out of five or any other desired.

As the code representations appear, they are entered into the first stage of register 19 which would consist of as many storage elements as there are bit positions in the code being used. The register is advanced by digit ring 45 for each digit register as shown prior to the receipt of the first digit from translator 15 or subsequent to the last digit of a word from translator 15.

As noted previously, stages D0–D9 are used for stepping shift register 19 and for reading buffer 12 to effect synchronization in the transfer of information. Stages D*x* and D10 of digit ring 14 are used to effect the transfer of the word to and from storage 17 at the proper instant. Prior to the time of reading the first digit of a word from buffer 12, the digit pulse D*x* is used with the output of emitter 49 by AND 69 to select a zone **17*a* and with word ring 13 to select the word within the zone to be shifted into register 19. Digit pulse D10 is used with AND 71 to effect the selection of the position within storage that the data in register 19 is to be transferred. An output 73 provides the shift pulse to the register 19**, which may be of the type shown in Patent No. 3,140,472.

While the invention has been particularly shown and described with reference to a preferred embodiment thereof, it will be understood by those skilled in the art that various changes in form and details may be made therein without departing from the spirit and scope of the invention.

What is claimed is:

1. A device for transferring data characters from a storage medium to a storage means wherein said characters are contained in a plurality of columns and coded by the presence of bits in selected rows of said columns, means for sensing said bits by row, means for translating each bit sensed in a particular row into a coded indication of said row, a register including a plurality of stages for accumulating a plurality of columns of coded indications from said translating means, a storage means connected to receive said coded indications from said register, selection means for determining the location in said storage to which the contents of said register will be transferred, means responsive to the row of data then being sensed to control said selection means, means included in said last-mentioned means operating said selecting means to provide the same storage location for selected rows of data, means for stepping said register whereby successive serial indications are stored in said register, means responsive to a number of indications equal to the number of stages in said register for simultaneously transferring the entire contents of said register to the selected position in said storage, and means for simultaneously transferring the entire contents of a selected position in storage to said register in timed relation to the coded indications to be stored in the same position from a succeeding row in said storage medium.

2. The apparatus of claim 1 wherein said sensing means includes a buffer for receiving each successive row of bit positions, word and digit drivers operable to read each successive column of information into said translator, means for connecting said digit driver to said register for stepping the same in timed relation to the readout of said buffer, means connecting said word driver to said selection means to provide one coordinate of the position desired for storage of said indication, means responsive to the termination of a word for shifting the contents of said register to said selected position and means responsive to the beginning of the next successive word for transferring the data in the position related thereto to said register.

References Cited by the Examiner

UNITED STATES PATENTS

| | | | |
|---|---|---|---|
| 2,702,380 | 2/55 | Brustman | 340—172.5 |
| 2,984,823 | 5/61 | Spencer | 340—172.5 |
| 2,997,696 | 8/61 | Buchholz | 340—172.5 X |

OTHER REFERENCES

Publication: "IBM Reference Manual RAMAC 305," copyright 1958, 1959, by International Business Machines Corp.

MALCOLM A. MORRISON, *Primary Examiner.*

IRVING L. SRAGOW, *Examiner.*